Figure 3:
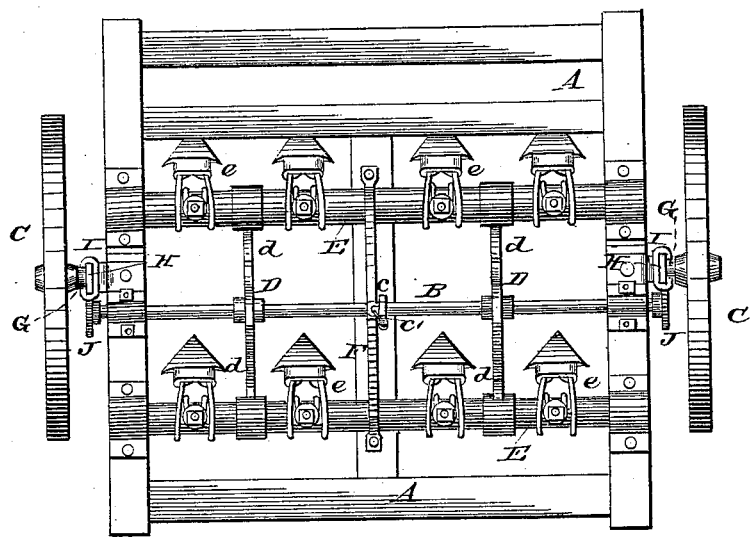

(No Model.)
2 Sheets—Sheet 1.
C. H. EGGLESTON.
WHEEL HARROW AND CULTIVATOR.
No. 272,668. Patented Feb. 20, 1883.
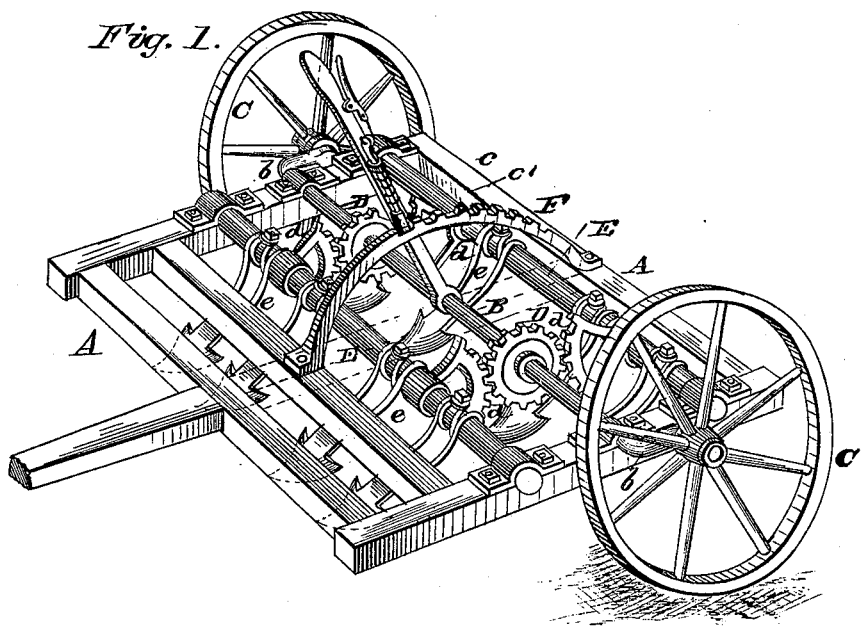
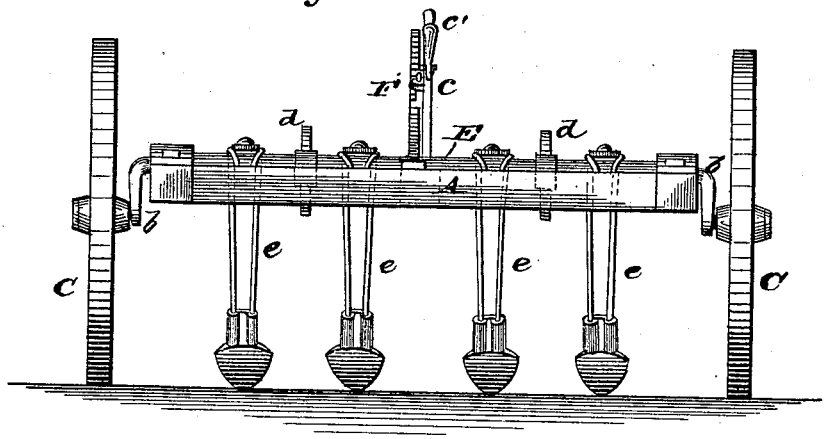
WITNESSES:
Fred. G. Dieterich.
P. C. Dieterich.
INVENTOR.
Charles H. Eggleston
per DeWitt C. Allen ATTORNEY.

(No Model.)  2 Sheets—Sheet 2.

C. H. EGGLESTON.
WHEEL HARROW AND CULTIVATOR.

No. 272,668. Patented Feb. 20, 1883.

WITNESSES:
Fred. G. Dieterich
P. C. Dieterich

INVENTOR.
Charles H. Eggleston
per.
DeWitt C. Allen ATTORNEY.

UNITED STATES PATENT OFFICE.

CHARLES H. EGGLESTON, OF MARSHALL, MICHIGAN.

WHEEL HARROW AND CULTIVATOR.

SPECIFICATION forming part of Letters Patent No. 272,668, dated February 20, 1883.

Application filed April 11, 1882. (No model.)

*To all whom it may concern:*

Be it known that I, CHARLES H. EGGLESTON, a citizen of the United States, residing at Marshall, in the county of Calhoun and State of Michigan, have invented certain new and useful Improvements in Wheel Harrows and Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to certain new and useful improvements in the class of wheel harrows and cultivators in which rocking-shafts are employed for carrying and rocking the teeth; and the invention consists in novel features of construction and combination and arrangement of parts, all as will be hereinafter fully described, and set forth in the claims hereto annexed.

In the accompanying drawings, Figure 1 represents a view in perspective of my improved machine; Fig. 2, a rear end view of the same; Fig. 3, a top view or plan.

A represents the frame of my improved harrow and cultivator; B, a transverse shaft or axle journaled in suitable bearings on said frame, and having at its ends cranks *b b*, upon which are mounted the supporting-wheels C C. To the shaft or axle B is connected a lever, *c*, and upon said shaft or axle are mounted toothed pinions D or segments thereof, which pinions or segments are adapted to engage with toothed segments *d d*, mounted upon the front and rear rocking shafts or rollers, E E, journaled in bearings on the main frame, and which carry spring-teeth *e*. The lever *c* has a spring-pawl, *c'*, adapted to engage the notched segmental bar F, by which said lever can be secured in any desired position.

By means of the above-described construction of parts it will be observed that the frame may be raised or lowered, and the shafts or rollers carrying the teeth simultaneously rocked in their bearings to give the teeth a greater inclination from the perpendicular to form a cultivator, as shown in Fig. 1, when the frame is lowered, and less inclination to form a harrow, as shown in Fig. 2. It may be lowered into position for harrowing, and locked by means of said devices.

In lieu of the cranks, the wheels may be mounted on stub-axles G, Fig. 3, having vertical rack-bars H, arranged to be moved vertically in slotted guides secured to the main frame A, and which rack-bars are moved vertically by pinions J, mounted on the ends of the main shaft or axle B, and projecting through the slots of the side edges of the plates I, whereby said shaft or axle, on being turned through the medium of the pinions and rack-bars, will raise or lower the wheels, and thereby raise or lower the frame in a similar manner to the crank-axles, and also operate the toothed shaft or rollers simultaneously therewith by the means before described.

Further description of the operation of the machine is deemed unnecessary, it being obvious from the foregoing.

I am aware that an axle having cranks at each end upon which the wheels are mounted, whereby the frame may be raised or lowered, and also vibrating shafts, each carrying a series of teeth connected together so as to be operated by a single lever, are old in harrows; and such I do not wish to be understood as claiming, broadly, as of my invention.

Having thus described my invention, what I claim as new and useful, and desire to secure by Letters Patent, is—

1. In a wheel harrow and cultivator, the combination, with the frame, main shaft or axle, and supporting-wheels, and intermediate connecting mechanism by which said wheels may be raised or lowered for raising or lowering the frame, and the shafts or rollers carrying the teeth journaled to said frame, arranged in front and rear of the main shaft or axle, of intermediate mechanism connecting the main axle or shaft with the toothed shafts or rollers, and a lever by which the main frame may be raised or lowered and the toothed shafts or rollers simultaneously rocked in their bearings for changing the inclination of the teeth, substantially as herein shown and described, and for the purpose specified.

2. In a wheel harrow and cultivator, the combination, with the frame A, shaft B, provided with pinion D or segments thereof, lever c, rigidly secured to said shaft and locking mechanism, supporting-wheels C C, and mechanism for connecting the shaft B with the supporting-wheels, of the rocking shafts or rollers E E, carrying teeth e, and provided with toothed segments d d, the several parts arranged to operate substantially in the manner herein shown and described, and for the purpose specified.

In testimony whereof I affix my signature in presence of two witnesses.

CHARLES H. EGGLESTON.

Witnesses:
 DAVID CUNNINGHAM,
 JOHN BUTLER.